United States Patent
Smidt et al.

(10) Patent No.: US 6,717,388 B2
(45) Date of Patent: Apr. 6, 2004

(54) BIDIRECTIONAL CONVERTER WITH INPUT VOLTAGE CONTROL BY A PRIMARY SWITCH AND OUTPUT VOLTAGE REGULATION BY A SECONDARY SWITCH

(75) Inventors: Pieter Jan Mark Smidt, Eindhoven (NL); Thomas Duerbaum, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/144,818

(22) Filed: Oct. 25, 2001

(65) Prior Publication Data

US 2002/0190698 A1 Dec. 19, 2002

(30) Foreign Application Priority Data

Oct. 27, 2000 (EP) .................................. 00203795

(51) Int. Cl.$^7$ ................................................. G05F 1/59
(52) U.S. Cl. ..................... 323/271; 323/222; 323/282; 323/299; 363/21.14
(58) Field of Search ................... 323/222, 271, 323/282, 299, 351; 363/21.12, 21.14

(56) References Cited

U.S. PATENT DOCUMENTS

| | | | | |
|---|---|---|---|---|
| 3,986,097 A | * | 10/1976 | Woods | |
| 4,168,477 A | * | 9/1979 | Burchall | |
| 4,347,474 A | * | 8/1982 | Brooks et al. | 323/222 |
| 4,672,303 A | * | 6/1987 | Newton | 323/222 |
| 4,736,151 A | * | 4/1988 | Dishner | 323/222 |
| 4,801,859 A | * | 1/1989 | Dishner | 323/222 |
| 4,931,716 A | * | 6/1990 | Jovanovic et al. | 323/271 |
| 4,958,121 A | * | 9/1990 | Cuomo et al. | 323/299 |
| 4,967,138 A | * | 10/1990 | Obergfell et al. | 323/299 |
| 5,066,900 A | * | 11/1991 | Bassett | 323/282 |
| 5,220,492 A | | 6/1993 | Rubin et al. | 363/21 |
| 5,406,471 A | * | 4/1995 | Yamanaka | 323/271 |
| 5,479,089 A | * | 12/1995 | Lee | 323/282 |
| 5,739,679 A | * | 4/1998 | Takehara et al. | 323/299 |
| 5,745,351 A | | 4/1998 | Taurand | 363/20 |
| 5,764,495 A | | 6/1998 | Faulk | 363/21 |
| 5,844,399 A | * | 12/1998 | Stuart | 323/271 |
| 6,008,630 A | * | 12/1999 | Prasad | 323/222 |
| 6,058,026 A | * | 5/2000 | Rozman | 363/21.14 |
| 6,069,804 A | * | 5/2000 | Ingman et al. | 363/21.14 |
| 6,194,880 B1 | * | 2/2001 | Fraidlin et al. | 323/282 |
| 6,232,752 B1 | * | 5/2001 | Bissell | 323/271 |
| 6,294,900 B1 | * | 9/2001 | Greenwood et al. | 323/222 |
| 6,320,358 B2 | * | 11/2001 | Miller | 323/271 |
| 6,366,070 B1 | * | 4/2002 | Cooke et al. | 323/222 |
| 6,407,934 B1 | * | 6/2002 | Ishii et al. | 363/21.14 |
| 6,462,965 B1 | * | 10/2002 | Uesono | 363/21.14 |

FOREIGN PATENT DOCUMENTS

| | | | | |
|---|---|---|---|---|
| AT | 399432b | | 5/1995 | ......... H02M/5/293 |
| EP | 0013332 | * | 7/1980 | ......... H02M/3/335 |
| EP | 0336725 | * | 10/1989 | ......... H02M/3/335 |
| EP | 0967714 A2 | | 12/1999 | ............ H02M/3/28 |

* cited by examiner

Primary Examiner—Jeffrey Sterrett

(57) ABSTRACT

A buck converter, boost converter or flyback converter is generally represented as a two-port having a primary side with a primary switching device (10; 38; 70; 98; 110), and a secondary side with a secondary switching device (20; 50; 80; 106). The primary switching device is controlled in such a way that the on-time is adapted to the voltage at the primary side of the converter. The relation between the on-time of the primary switching device and the primary voltage is a generally hyperbolic function.

13 Claims, 3 Drawing Sheets

BIDIRECTIONAL CONVERTER WITH INPUT VOLTAGE CONTROL BY A PRIMARY SWITCH AND OUTPUT VOLTAGE REGULATION BY A SECONDARY SWITCH

The present invention relates to a converter for converting a primary voltage supplied to a primary port to a secondary voltage supplied to a secondary port, the converter comprising a primary switching device connected in series with the primary port, a secondary switching device connected in series with the secondary port, primary switching control means for controlling the switching of the primary switching device, and secondary switching control means for controlling the switching of the secondary switching device. The converter may be used in AC-DC and DC-DC power conversion, in particular in the lower power range such as for, but not restricted to, universal power supplies. The invention also relates to a control method for such a converter, and to a control circuit for implementing the control method. The invention further relates to a display apparatus comprising such a converter.

In converter applications which have to deal with a wide input voltage variation, for example, in a range of 50–400 V, the conduction time of the primary switching device at the primary port of the converter has to be chosen in such a way that an energy transfer which is high enough is ensured, even for the lowest primary voltage. If a fixed conduction time of the primary switching device is used, as e.g. disclosed in EP-A-0,336,725, extremely high currents result for higher primary voltages, leading to high current ratings, high RMS losses, and to a large amount of circulating energy in the converter.

As an example, a bidirectional flyback converter is described in more detail. U.S. Pat. No. 3,986,097 and EP-A-0,013,332 disclose power train structures of a bidirectional flyback converter.

In general, a bidirectional flyback converter comprises a transformer having a primary winding and a secondary winding, a primary switching device coupled in series with the primary transformer winding, and a secondary switching device coupled in series with the secondary transformer winding. If it is assumed that all circuit elements are ideal (no parasitic, leakage or stray inductances, no parasitic capacitances), the operation of the converter basically has two modes: a conduction mode at the primary side of the transformer and a conduction mode at the secondary side of the transformer. Both modes can be divided into two sub-modes: during a first time period of each conduction mode, energy is delivered to the associated side, while during a second time period of each conduction mode, energy to be delivered to the other side is stored in the transformer. During said first time period, the current can flow either through a diode coupled in parallel with the switching device, or through the switching device itself if it is bi-directional. The switching device can be switched on during said first time period under zero voltage condition.

In a bi-directional flyback converter, power may flow from a primary side to a secondary side but also in the reverse direction. The secondary side may be controlled to reflect excessive power to the primary side, which allows for a regulation of an output voltage or an output current at the secondary side. The primary side may be controlled to provide enough energy to the secondary side.

Prior art flyback converters suffer from one or more of the following problems: high switching losses, necessity of an isolated feedback (at least when an accurate control is mandatory), difficult no-load control, and low efficiency due to losses in the output rectifier in the case of low output voltages.

It is an object of the invention to lower the switching losses for a converter, allowing for higher switching frequencies and/or smaller designs.

According to the present invention, this object is achieved in a converter control method which is characterized as defined in claim 1, a converter which is characterized as defined in claim 5, and a control circuit for a converter which is characterized as defined in to claim 13.

In the converter according to the invention, variations of the input voltage are controlled at the primary switching device, while load regulation takes place at the secondary switching device.

The control according to the invention allows for a relatively low amount of circulating energy that results in a good partial load efficiency of the converter. In the case of no-load, the power dissipation can be made small at a finite switching frequency.

Under steady state of the bi-directional converter, a certain minimum amount of energy is reflected back to the primary side. Under no-load condition the secondary side controller will reflect the complete energy (minus the energy dissipated during one cycle through the transformer) transferred from the primary. The energy transfer from and to the secondary side needs a certain time span. Thus the converter is regulated at a finite frequency. The primary side control in accordance with the invention adjusts the amount of excessive energy by adapting the on-time in dependence of the input voltage. This results in a better part load efficiency for input voltages.

A further aspect of the invention provides a display apparatus comprising a converter as defined in claim 13.

Other claims, features and advantages of the invention will be apparent clear from the following description of the appended drawings showing a non-limiting embodiment, in which:

In the different Figures, identical reference numerals relate to identical components or components having an identical function.

Figure 1:
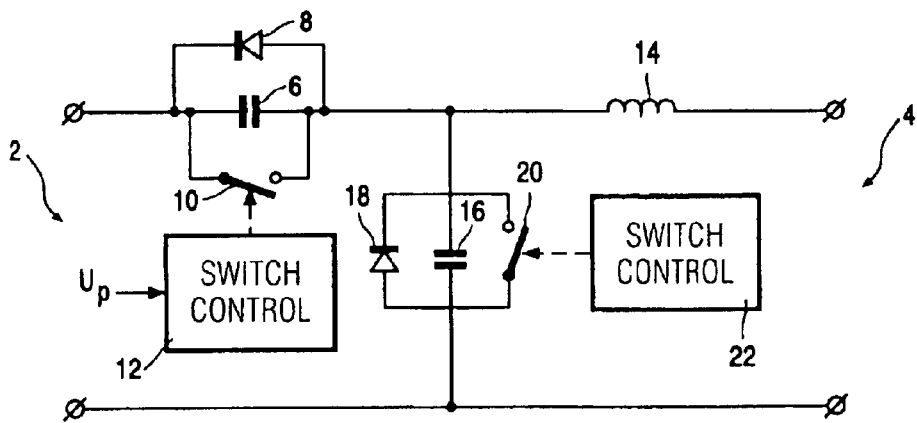
FIG. 1 is a schematical diagram of a first type of a converter according to the invention.

FIG. 1 is a general diagram of a buck converter comprising a primary port 2 and a secondary port 4. A terminal of the primary port 2 is coupled with a first parallel arrangement of a capacitor 6 (possibly intrinsic or parasitic, e.g. inherent in one or more of the other circuit elements, such as switches), a diode 8, and a primary switch 10. The closing and opening of the primary switch 10 is controlled by a primary switch control circuit 12 to be illustrated and discussed in more detail below. A terminal of the secondary port 4 is coupled with an inductor 14. A second parallel arrangement of a (possibly parasitic or intrinsic) capacitor 16, a diode 18, and a secondary switch 20 is coupled with the first parallel arrangement and the inductor 14. The closing and opening of the secondary switch 20 is controlled by a secondary switch control circuit 22 to be illustrated and discussed in more detail below. Furthermore, the second parallel arrangement is coupled with a common terminal of the primary port 2 and the secondary port 4.

Figure 2:
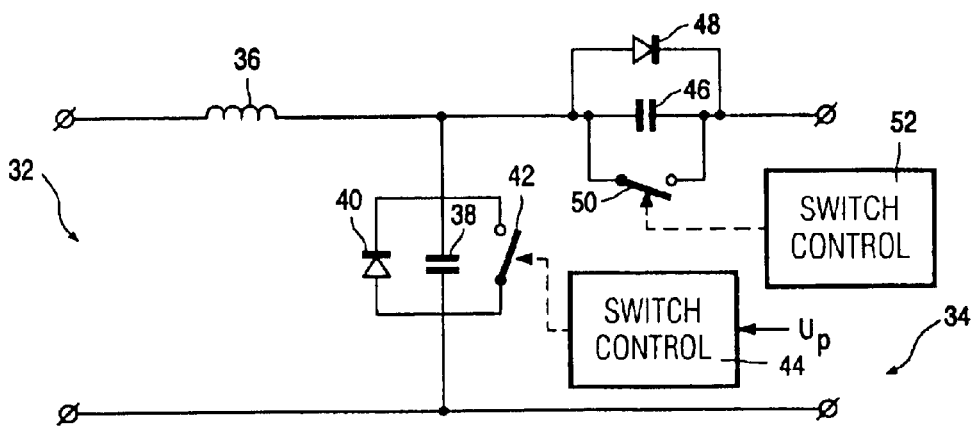
FIG. 2 is a schematical diagram of a second type of a converter according to the invention.

FIG. 2 is a general diagram of a boost converter comprising a primary port 32, and a secondary port 34. A terminal of the primary port 32 is coupled with an inductor 36. The side of the inductor 36 facing away from the primary port 32 is coupled with a first parallel arrangement of a (possibly parasitic or intrinsic) capacitor 38, a diode 40, and a primary switch 42. The closing and opening of the primary switch 42 is controlled by a primary switch control circuit 44 to be illustrated and discussed in more detail below. A second parallel arrangement of a (possibly parasitic or intrinsic) capacitor 46, a diode 48, and a secondary switch 50 is coupled with the first parallel arrangement, the inductor 36, and a terminal of the secondary port 34. The closing and opening of the secondary switch 50 is controlled by a secondary switch control circuit 52 to be illustrated and discussed in more detail below. Furthermore, the first parallel arrangement is coupled with a common terminal of the primary port 32 and the secondary port 34.

Figure 3:
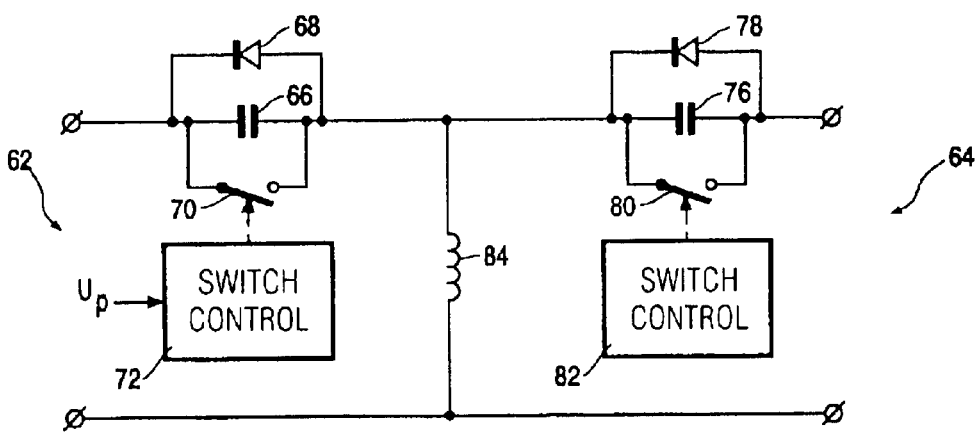
FIG. 3 is a schematical diagram of a third type of a converter according to the invention.

FIG. 3 is a general diagram of a flyback converter comprising a primary port 62 and a secondary port 64. A terminal of the primary port 62 is coupled with a first parallel arrangement of a (possibly parasitic or intrinsic) capacitor 66, a diode 68, and a primary switch 70. The closing and opening of the primary switch 70 is controlled by a primary switch control circuit 72 to be illustrated and discussed in more detail below. A terminal of the secondary port 64 is coupled with a second parallel arrangement of a (possibly parasitic or intrinsic) capacitor 76, a diode 78, and a secondary switch 80. The closing and opening of the secondary switch 80 is controlled by a secondary switch control circuit 82 to be illustrated and discussed in more detail below. The first parallel arrangement and the second parallel arrangement are coupled with an inductor 84, the opposite side of which is coupled with a common terminal of the primary port 62 and the secondary port 64.

Figure 4:
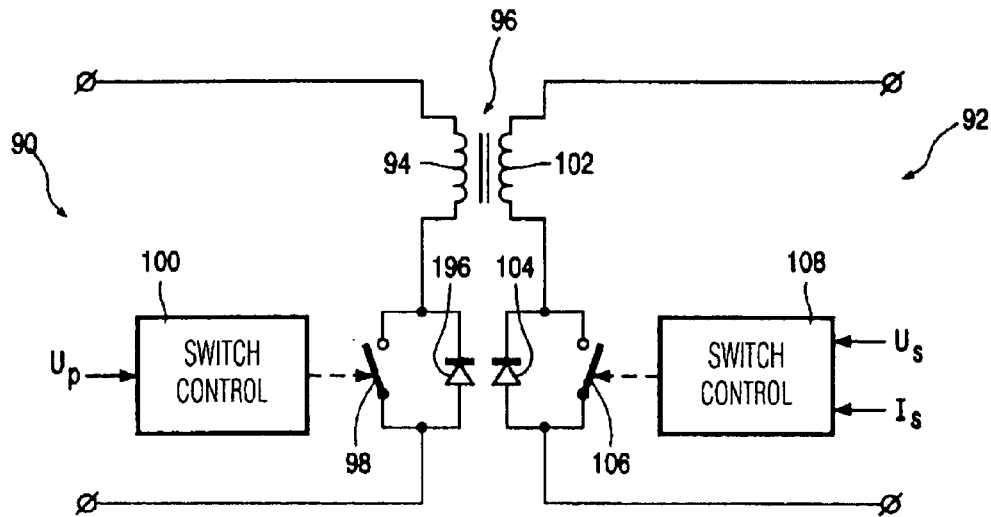
FIG. 4 is a schematical diagram of a mains isolated variant of the converter of FIG. 3.

FIG. 4 is a general diagram of a bidirectional flyback converter comprising a primary port 90 and a secondary port 92. A terminal of the primary port is coupled with a primary winding 94 of a transformer 96. The primary winding 94 is connected in series with a parallel arrangement of a diode 196 and a primary switch 98. The closing and opening of the primary switch 98 is controlled by a primary switch control circuit 100 to be illustrated and discussed in more detail below. A terminal of the secondary port is coupled with a secondary winding 102 of the transformer 96. The secondary winding 102 is connected in series with a parallel arrangement of a diode 104 and a secondary switch 106. The closing and opening of the secondary switch 106 is controlled by a secondary switch control circuit 108 to be illustrated and discussed in more detail below. In a practical embodiment, the switches 98 and 106 may each be implemented as a MOSFET, in which the diodes 196 and 104, respectively, may be intrinsic. The MOSFET may also have an intrinsic capacitance.

In the converters shown in FIGS. 1 to 4, the primary voltage $U_p$ applied to the primary ports 2, 32, 62 and 90 is used as an input control variable to the primary switch control circuits 12, 44, 72 and 100, respectively, whereas the secondary voltage $U_s$ and secondary current $I_s$ applied to the secondary ports 4, 34, 64 and 92 are used as input control variables to the second switch control circuits 22, 52, 82 and 108, respectively. As illustrated in more detail in FIG. 5, the primary voltage is compared with a corresponding reference value. The resulting error signal is used to control the on-time of the primary switch for controlling the primary voltage.

The secondary voltage $U_s$ and the secondary current $I_s$ are compared with corresponding reference values. The resulting error signal is used to control the on-time of the secondary switch to set the amount of secondary power for load regulation. The amount of secondary power can be determined either by controlling the negative peak current or the forward conduction time of the active switch. The derivation of the control value from the error can be done by conventional techniques, e.g. by means of an error amplifier with PI-characteristics.

An additional signal indicating that the diode associated with a switch is conducting, allows the active switch to be switched on under a zero voltage condition. The additional signal may be derived either from the voltage across the parallel combination of the active switch and the associated diode, or from the current through the combination. The additional signal can be derived by conventional methods.

In FIG. 4, use of a dead time between the control signals for the two switches together with the correct direction of the transformer currents results in zero voltage switching. Losses associated with the switching are thus eliminated almost completely.

Figure 5:
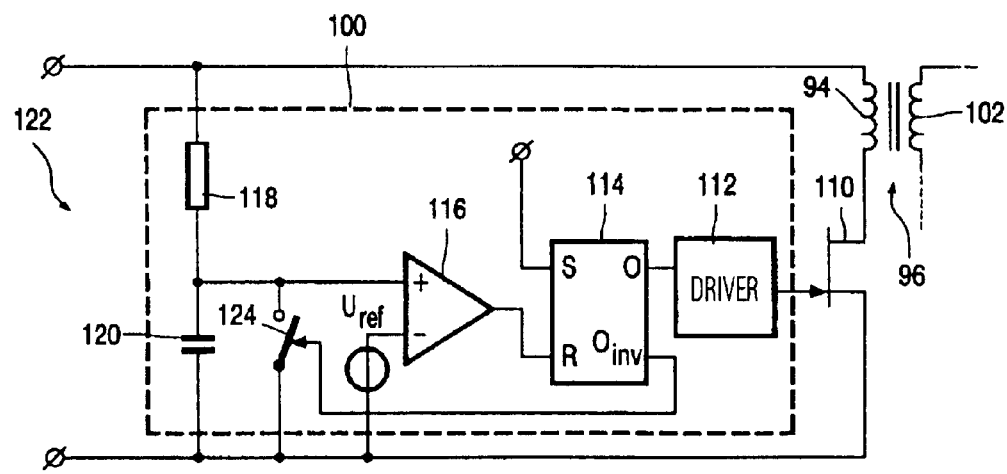
FIG. 5 illustrates an embodiment of a switching control circuit.

FIG. 5 shows a part of a bidirectional flyback converter, comprising the transformer 96 with the primary winding 94. The circuitry coupled with the secondary winding 102 of the transformer 96 is omitted from FIG. 5. In FIG. 5, the primary switch control circuit 100, indicated by dashed lines, is shown in detail. A primary switching device 110 embodied as a MOSFET (including an intrinsic anti-parallel diode) is coupled in series with the primary winding 94 of the transformer 96. A switching control input or gate of the MOSFET 110 is coupled with an output of a driver 112 for switching the MOSFET 110 on and off. The driver 112, which is known per se and is therefore not shown in greater detail, has an input coupled to an output O of a flip-flop device 114. A reset input R of the flip-flop device 114 is coupled to an output of a comparator 116 to which a reference voltage $U_{ref}$ is supplied. The voltage $U_{ref}$ in the comparator 116 is compared with a voltage $U_c$ obtained from a series connection of a resistor 1 18 and a capacitor 120 across the input of the primary port 122 of the converter. A bypass switch 124 is coupled in parallel with the capacitor 120, and is switched on and off by an inverted output signal $O_{inv}$ from the flip-flop device 114. The components 112 to 120, 124 form the primary switch control circuit 100 for the primary switching device 110.

The primary switch control circuit 100 operates as follows. A start primary stroke is supplied to a set input S of the flip-flop device 114. Thus, the flip-flop device is set, and the primary switching device 110 is switched on through the driver 112. At the same time, the bypass switch 124 is opened. Consequently, the voltage across the capacitor 120 will rise to the value $U_{ref}$. The comparator 116 will then reset the flip-flop device 114 through the input R thereof, and consequently open the primary switching device 110 (end of primary stroke), close the bypass switch 124, and keep the bypass switch closed for discharging the capacitor 120 until the next primary stroke start. The on-time $T_{on}$ of the primary switching device follows approximately from the equation:

$$T_{on}=R.C.U_{ref}/U_p$$

in which: R=resistor value in Ω [ohm]

C=capacitor value in F [farad]

The control circuitry 112 to 120, 124 may be either discrete or integrated.

Figure 6:
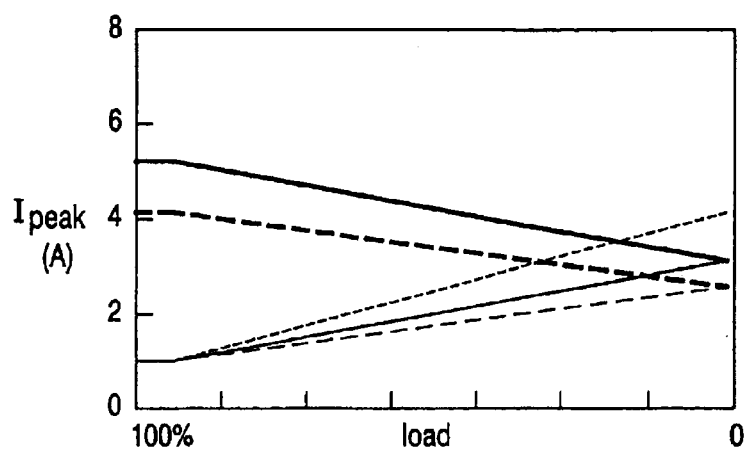
FIG. 6 shows a graph depicting the relation between the load and the peak current of the converter according to the invention.

FIG. 6 shows in bold lines a positive peak current $I_{peak}$, and in normal lines a negative peak current $I_{peak}$ for a specific converter under different load conditions between 0 and 100%, where the dotted line indicates values at a minimum primary voltage $U_p$, the solid lines indicate values at a nominal primary voltage $U_p$, and the dashed lines indicate values at a maximum primary voltage $U_p$.

Figure 7:
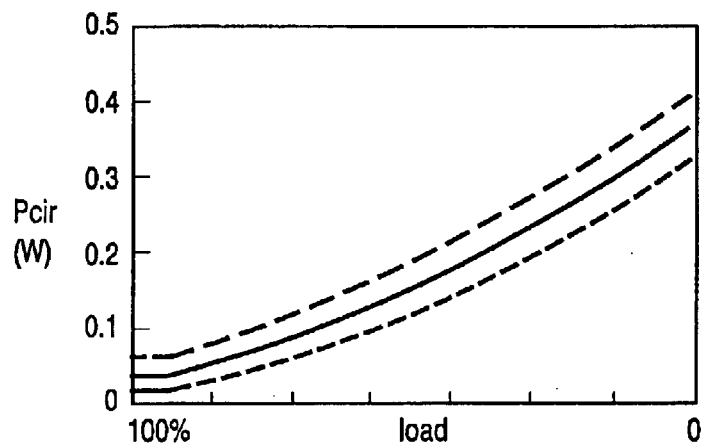
FIG. 7 shows a graph depicting the relation between the load and the circulating power of the converter according to the invention.

FIG. 7 shows the circulating energy $P_{cir}$ for a specific converter under different load conditions between 0 and 100%, where the dotted line indicates values at a minimum primary voltage $U_p$, the solid line indicates values at a nominal primary voltage $U_p$, and the dashed line indicates values at a maximum primary voltage $U_p$.

Figure 8:
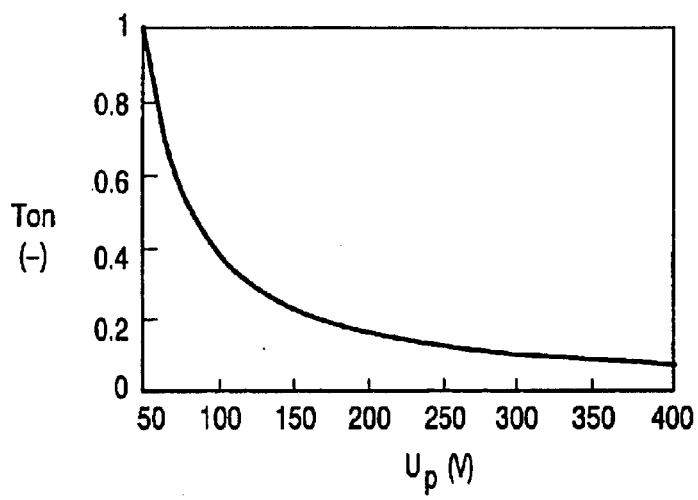
FIG. 8 shows a graph depicting a relation between a primary voltage and the on-time of the primary switch.

FIGS. 7 and 8 clearly illustrate the advantages of the control method according to the invention. For all primary voltages, the negative peak current is adjusted to the same value in the case of a maximum load. Therefore, the peak current as well as the circulating energy are minimized, which leads to a much more efficient and cost-effective converter with respect to the prior art.

FIG. 8 shows the normalized on-time $T_{on}$ for a certain application under different primary voltages $U_p$ in an ideal case (hyperbolic curve). However, any decaying function between the depicted curve and a horizontal line intersecting the value 1 of the normalised $T_{on}$ will be an improvement with respect to the prior art.

Different possibilities are available to obtain the control method according to the present invention. Instead of the analog solution explained in FIG. 5, in a digital implementation the primary voltage $U_p$ can also be converted into a digital value, which is compared with a look-up table representing the curve shown in FIG. 9. Then, the corresponding $T_{on}$ can be selected, and a counter can be started to count down with the gate turn-on signal obtained by a demagnetization signal. After the counter reaches zero, the switching device is turned off, and the counter is reloaded with a new updated value.

Thus, according to the present invention, a converter is controlled in such a way that the on-time of the switching device at the primary side of the converter is controlled in dependence upon the voltage applied at the primary port of the converter, the on-time generally decreasing at increasing primary voltages. In this way, a good partial load efficiency of the converter is obtained, while at no-load the dissipation is small at a finite switching frequency. Further miniaturization of the converter is possible.

Figure 9:
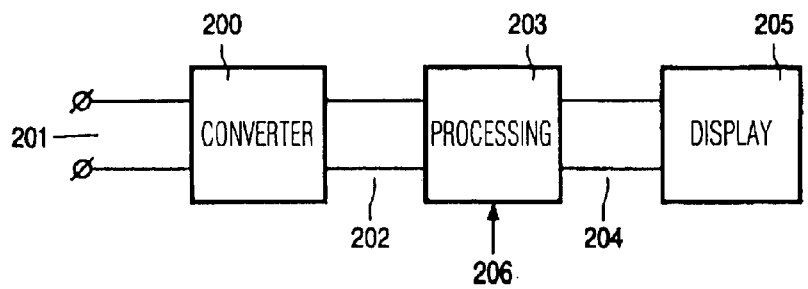
FIG. 9 shows a display apparatus comprising the converter.

FIG. 9 shows a display apparatus with a converter 200, a processing stage 203 and a display device 205.

The converter has a primary port 201 receiving the primary voltage (for example, the rectified mains voltage) and a secondary port 202 supplying the secondary voltage.

The processing stage 203 receives video input signals 206 (for example, RGB+synchronizing signal, or a composite video signal), and the secondary voltage which is a power supply voltage, to supply drive signals 204 to the display device.

The display device 205 (for example, a Cathode Ray Tube, or a matrix display device such as a Liquid Crystal Display) shows a picture corresponding to the video input signals 206.

What is claimed is:

1. A method of controlling the conversion of a primary voltage supplied to a primary port of a converter to a secondary voltage supplied to a secondary port of the converter, wherein the converter comprises first and second input terminals, first and second output terminals, and an intermediate node, the converter further comprising a primary switching device coupled in series with the primary port between the first input terminal and the intermediate node, and a secondary switching device coupled in series with the secondary port between the intermediate node and the first output terminal, characterized in that the on-time of the primary switching device is controlled by the primary voltage.

2. A method as claimed in claim 1, wherein the on-time of the primary switching device decreases when the primary voltage increases.

3. A method as claimed in claim 1, wherein the on-time of the primary switching device varies as a generally hyperbolic function as a function of the primary voltage.

4. A method as claimed in claim 1, wherein the secondary switching device is controlled to reflect excessive power to the primary side.

5. A converter for converting a primary voltage supplied to a primary port having first and second input terminals to a secondary voltage supplied to a secondary port having first and second output terminals via an intermediate node, the converter comprising a primary switching device coupled in series with the primary port between the first input terminal and the intermediate node, a secondary switching device coupled in series with the secondary port between the intermediate node and the first output terminal, primary switching control means for controlling the switching of the primary switching device, and secondary switching control means for controlling the switching of the secondary switching device, characterized in that the primary switching control means is adapted to control the on-time of the primary switching device by the primary voltage.

6. A converter as claimed in claim 5, wherein the on-time of the primary switching device decreases when the primary voltage increases.

7. A converter as claimed in claim 5, wherein the on-time of the primary switching device varies as a generally hyperbolic function as a function of the primary voltage.

8. A converter as claimed in claim 5, wherein the primary switching device and/or the secondary switching device comprises a MOSFET.

9. A converter as claimed in claim 5, comprising a transformer with a primary winding being connected in series with the primary port, and a secondary winding being connected in series with the secondary port.

10. A converter as claimed in claim 5, wherein the converter is a buck converter.

11. A converter as claimed in claim 5, wherein the converter is a boost converter.

12. A converter as claimed in claim 5, wherein the converter is a flyback converter.

13. A display apparatus comprising a converter as claimed in claim 5.

* * * * *